(12) United States Patent
Avers et al.

(10) Patent No.: US 7,909,731 B2
(45) Date of Patent: Mar. 22, 2011

(54) VEHICLE SHIFT MODULE ASSEMBLY

(75) Inventors: Wayne M. Avers, Northville, MI (US);
Steven Waldie, Brighton, MI (US);
Gregory A. Scout, Temperance, MI (US); Daniel McCluskey, Harrison Township, MI (US); Jeffrey Adelmann, Livonia, MI (US); Joe Carano, South Lyon, MI (US)

(73) Assignee: Admiral Tool & Manufacturing of Michigan, Livonia, MI (US)

( * ) Notice: Subject to any disclaimer, the term of this patent is extended or adjusted under 35 U.S.C. 154(b) by 336 days.

(21) Appl. No.: 12/187,047

(22) Filed: Aug. 6, 2008

(65) Prior Publication Data

US 2010/0031769 A1    Feb. 11, 2010

(51) Int. Cl.
*B60W 10/00* (2006.01)
(52) U.S. Cl. ............................................ 477/94; 477/96
(58) Field of Classification Search ........................ None
See application file for complete search history.

(56) References Cited

U.S. PATENT DOCUMENTS

| | | | | |
|---|---|---|---|---|
| 5,647,818 A | * | 7/1997 | Moody | 477/99 |
| 5,853,348 A | * | 12/1998 | Lehman | 477/96 |
| 5,902,209 A | * | 5/1999 | Moody | 477/99 |
| 6,817,966 B2 | * | 11/2004 | Avers et al. | 477/96 |
| 7,597,649 B2 | * | 10/2009 | Wang | 477/99 |

* cited by examiner

*Primary Examiner* — Dirk Wright
(74) *Attorney, Agent, or Firm* — Reed Smith, LLP

(57) ABSTRACT

A shift module assembly for controlling the movement of a vehicle transmission out of a park condition responsive to a condition of the ignition system of the vehicle and responsive to a position of the vehicle brake pedal includes a moveable swing arm adapted to selectively control the condition of the vehicle transmission. The swing arm is in a park position when the vehicle transmission is in the park condition. The swing arm is locked in an immobile position by a solenoid operated armature shaft when the swing arm is placed in the park position. The armature shaft is in direct contact with said swing arm when said swing arm is in the locked position. The armature shaft releases the swing arm from the locked position upon actuation of the vehicle ignition system and depression of the vehicle brake pedal. The swing arm includes a stress line that will cause the swing arm to break along the stress line before, the swing arm is moved out of the park position if excessive force is applied to the swing arm. In addition, the swing arm is capable of both rotational and rocking movement about a common pivot point.

22 Claims, 5 Drawing Sheets

VEHICLE SHIFT MODULE ASSEMBLY

This invention relates to a shift module assembly having an interlock prohibiting movement of a vehicle's shifting arm and transmission out of a park position until the vehicle brake is depressed and the ignition system is turned on, and prevents removal of the ignition key unless the gear shift selector arm is in the park position. The interlock is located on the shift module directly adjacent the swing arm controlling the condition of the transmission.

BACKGROUND OF THE INVENTION

Safety mechanisms which prohibit vehicles from moving when the operator is not in control of the vehicle are very important. Often times, these safety mechanisms are overly complicated aid require many electronic and mechanical moving parts. It is also difficult to incorporate these safety mechanisms into existing modular and compact vehicle components. This creates a problem because of the tendency for overly complicated and widely dispersed mechanical parts that require maintenance or fail completely.

Therefore, it is necessary for these safety mechanisms to be as simple and effective as possible. However, presently available devices do not deploy a control mechanism attached directly to the shift module that applies a positive mechanical stop mechanism against the shift swing arm, thus physically preventing movement of the swing arm out of the park position until the brake foot pedal is depressed and the ignition key is in the "on" position. Also, previous devices utilize cumbersome non-integral mechanisms that prevent removal of the ignition key when the manual shift lever is in one of the other vehicle operating positions, such as drive, neutral or reverse. In addition, previous shift module devices can be physically forced out of the park position, thereby jeopardizing the safety of the vehicle. These prior devices are also difficult to install on existing vehicles, and to repair, and involve the cooperative function of several parts attached to diverse and distant parts of the vehicle. In addition, a safety solenoid interlock that keeps a vehicle in a park condition until the brake pedal is depressed must be sturdy enough to withstand years of constant use, and be simple enough to require little or no maintenance. The shift module disclosed herein packages the shifting and brake release functions all in one, small integrated compact unit which has minimal moving parts.

SUMMARY OF THE INVENTION

The present invention provides a safety solenoid shaft positive interlock mounted directly adjacent a shift module swing arm that maintains a vehicle shift lever in the park position until the brake pedal is depressed. At the same time, the shift module assembly is simple in construction and operation, and requires little or no maintenance.

A mounting bracket allows the shift module assembly and its solenoid locking mechanism to be mounted directly to the steering column of the vehicle as an integral compact unit. The shift module assembly allows regular operator manual shifting between park, drive, reverse, and neutral, and communicates the operator's request to the vehicle's transmission through a bishop head pin attached to a transmission shift control rod. The shift module assembly includes a solenoid armature shaft movable to a position in contact with a swing arm of the shift module assembly, precluding movement of the shifting lever out of the park position until the vehicle ignition is on and the brake pedal is depressed by the operator.

This provides a compact unit that prevents accidental shifting into neutral drive or reverse while the vehicle transmission is in the park condition. The shift lever is physically locked in place by an solenoid armature shaft mounted on the same mounting bracket as the swing arm, and the armature shaft retracts when the brake pedal is depressed. A further safety mechanism in the shift module is a switch integral with the solenoid housing, which switch is actuated by the shift lever to keep the vehicle's ignition key from being removed unless the vehicle is in the park condition. Another unique feature of the present invention is the configuration of the swing arm of the shift module assembly that causes the swing arm to break off from the shift module assembly if an operator attempts to use excessive force to move the shift lever out of park without first depressing the brake pedal.

BRIEF DESCRIPTION OF THE DRAWINGS

Certain examples of the present invention are illustrated by the accompanying figures. It should be understood that the figures are not necessarily to scale and that details that are not necessary for an understanding of the invention or that, render other details difficult to perceive may be omitted. It should be understood as well that the invention is not necessarily limited to the particular examples illustrated herein.

DETAILED DESCRIPTION OF THE ILLUSTRATED EMBODIMENT

Figure 1:
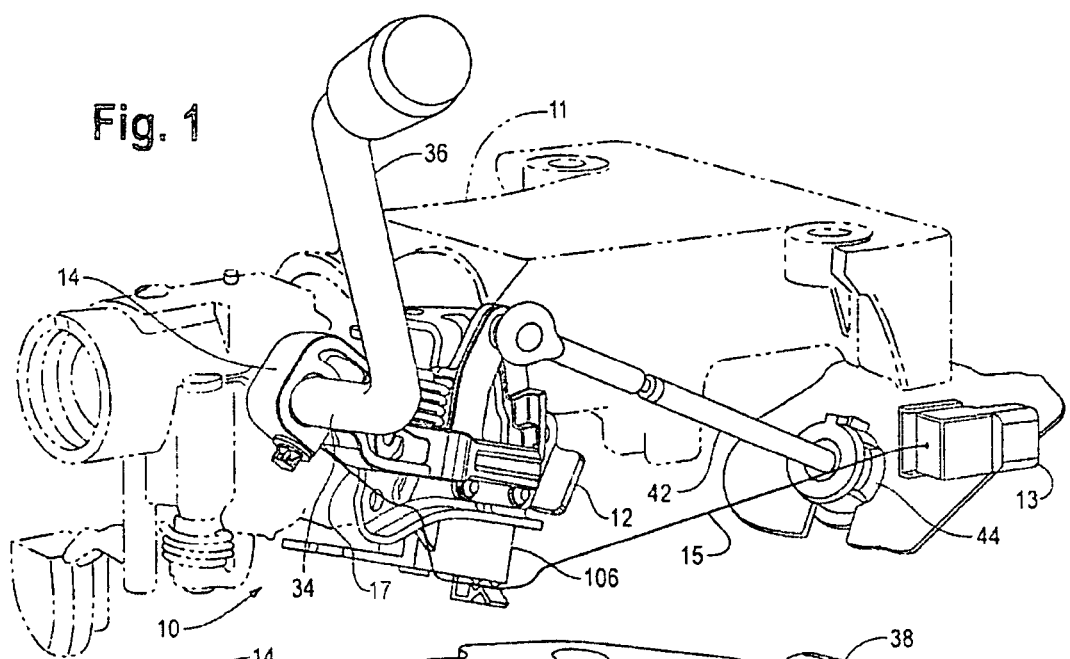
FIG. 1 is a perspective view of the shift module assembly of the present invention attached to a vehicle steering column, showing the integral interlock control.
Figure 2:
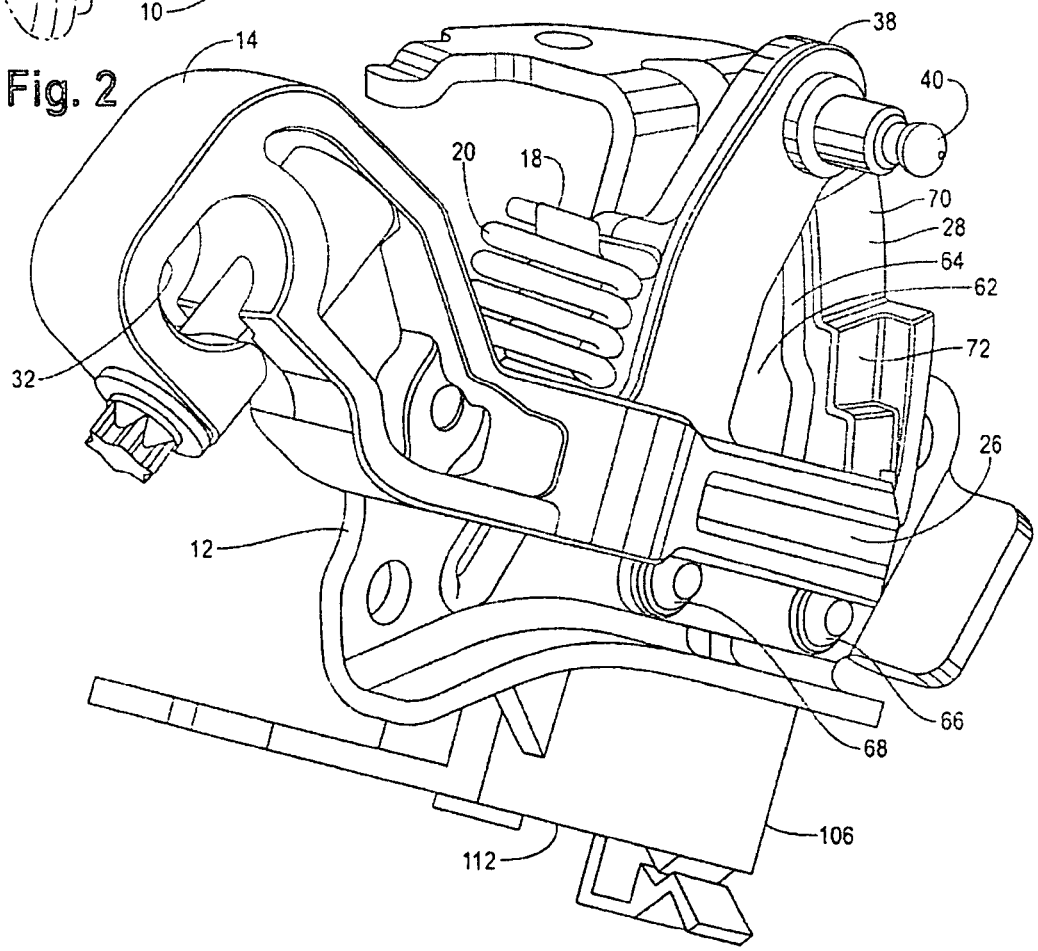
FIG. 2 is a perspective view of the shift module assembly of FIG. 1.
Figure 10:
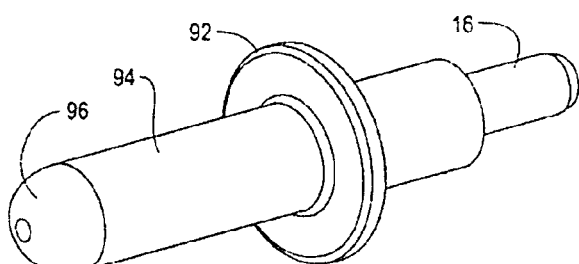
FIG. 10 is a detail view of the pivot bolt of the present invention.

Referring to FIGS. 1 and 2, the shift module assembly 10 is mounted to a vehicle on the steering column 11 by way of the mounting bracket 12. A swing arm 14 is pivotally supported on the mounting bracket 12 by way of pivot bolt 16 (FIG. 10).

The pivot bolt 16 allows the swing arm 14 to pivot in two directions: a limited rocking movement in a plane normal to the plane of mounting bracket 12, and rotational movement around pin 16, as will be explained in further detail. A spring mounting pin 18 (FIG. 2) extends outwardly from swing arm 14, and a cross-over spring 20 is mounted over pin 18. One end 22 of cross-over spring 20 engages the swing arm 14, and the other end 24 (FIG. 6) engages the end of pivot bolt 16 where the pivot bolt extends outward from mounting bracket 12. The cross-over spring 20 applies a constant force to the swing arm 14 relative to mounting bracket 12, maintaining the default position of one end 26 of swing arm 14 pressing against multi-profile gate plate 28. Gate plate 28 is removably attached to mounting bracket 12, as will be explained.

The end 30 of swing arm 14 opposite end 26 includes an adjustable diameter aperture 32 that is adapted to receive and hold end 34 of manually operated shift lever 36 (FIG. 1). Shift lever 36 is used by the vehicle operator to select a desired transmission gear condition, as is known in the art.

Referring to FIG. 2, swing arm 14 also includes an integral upward directed arm 38 to which a bishop head pin 40 is attached. As seen in FIG. 1, transmission control rod 42 is pivotally connected at one end to bishop head pin 40. Axial movement of control rod 42 will alter the position of the manual shift valve in the hydraulic or electrical transmission control system (not shown), which controls the gear trains in the transmission housing 44.

Figure 7:
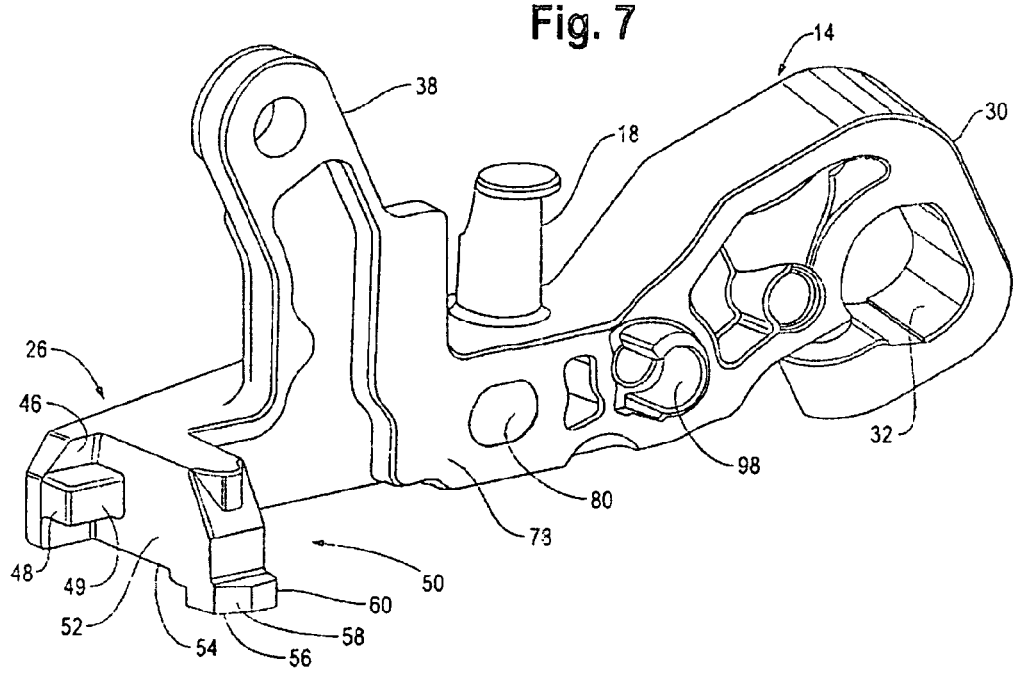
FIG. 7 is a perspective detail view of the swing arm of the present invention, showing the locking and switch actuator assembly.
Figure 8:
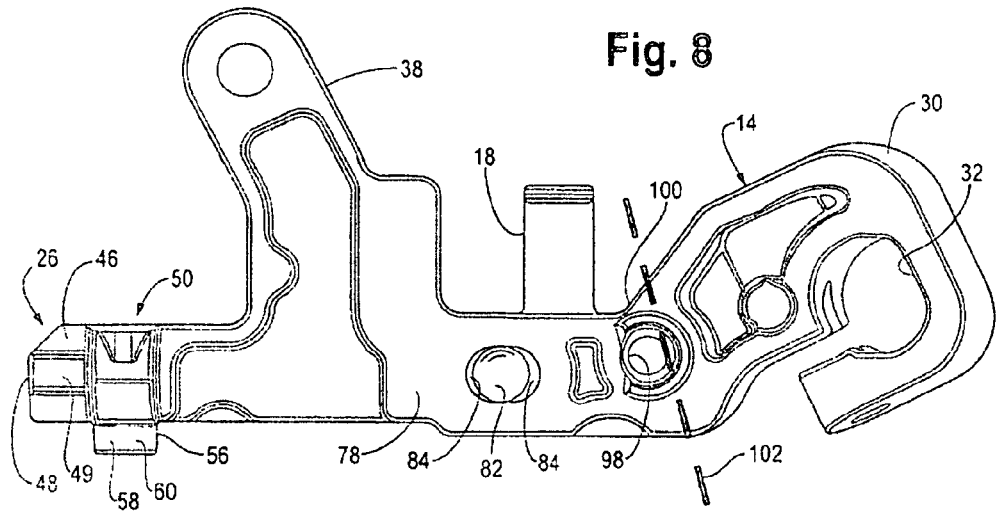
FIG. 8 is a side view of the swing arm shown in FIG. 7, also showing the fuse or break location.
Figure 9:
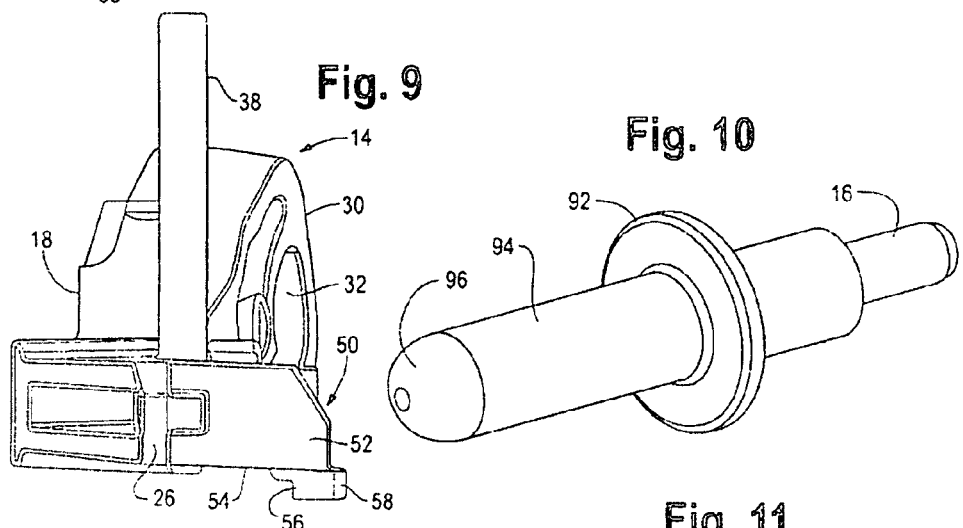
FIG. 9 is an end view of the swing arm shown in FIG. 8, which interacts with the solenoid shaft and switch actuator of the present invention.

As seen in FIGS. 7-9, the end 26 of swing arm 14 comprises an extending surface 46, with a gate contact flange 48 extending outward at approximately ninety degrees from surface 46. Flange 48 has a flat underside 49 adapted to contact the various profile surfaces of gate 28, as will be described. Adjacent the contact flange 48, a locking and switch actuator assembly 50 also extends outwardly from surface 46. Assembly 50 includes a support bracket 52 having a flat underside surface 54. Assembly 50 also includes a downwardly extending park detect switch actuator 56. Actuator 56 includes a first inclined, sidewards facing surface 58 and a second surface 60, generally parallel to surface 46 of swing arm 14.

Figure 6:
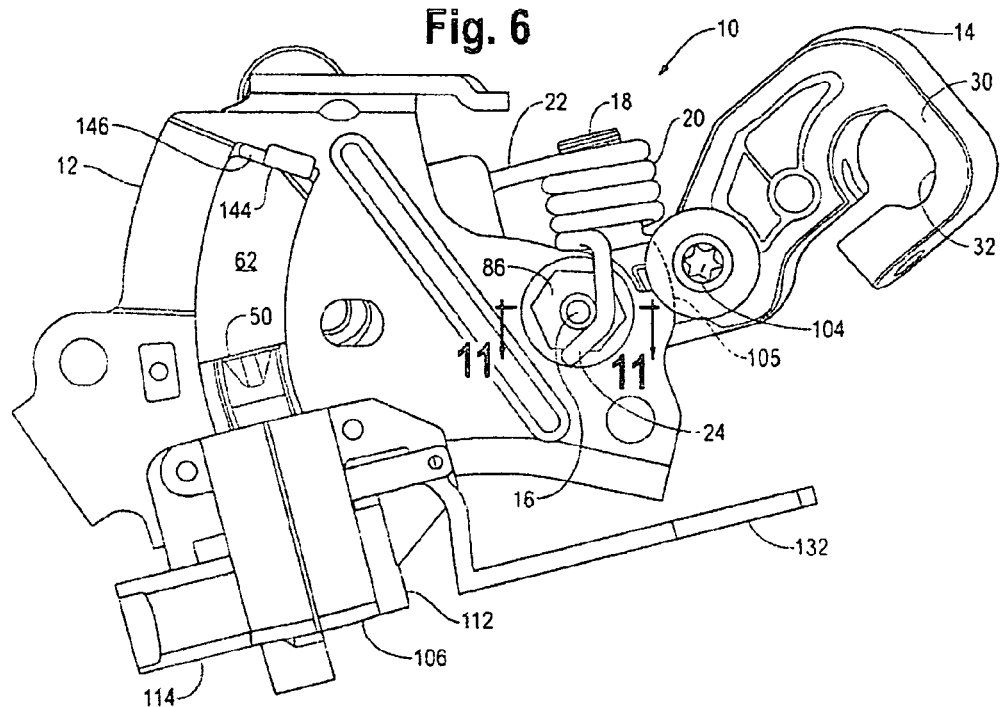
FIG. 6 is a plan view of the opposite side of the shift module assembly shown in FIG. 2.
Figure 13:
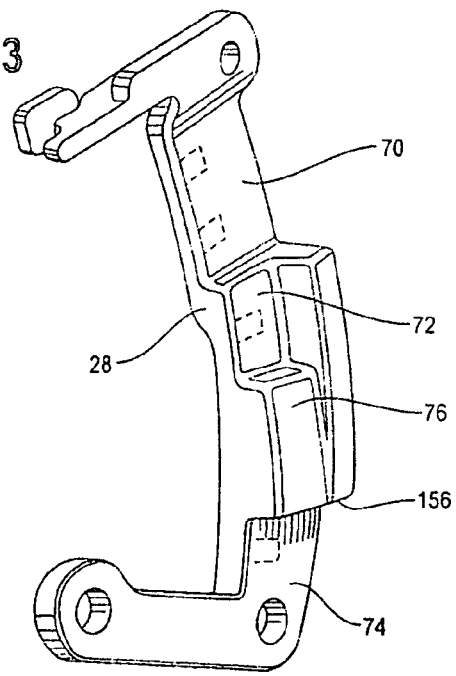
FIG. 13 is a detailed view of the multiple gate profile insert forming a part of the present invention.

Referring to FIGS. 2, 6 and 13, mounting bracket 12 includes a relatively wide opening 62, formed on one side by a ledge portion 64 of mounting bracket 12. Multiple gate profile plate 28 is firmly attached to ledge portion 64 with fasteners 66, 68. Referring to FIG. 13, gate profile plate 28 has a first profile surface 70, a second profile surface 72, and a third profile surface 74. A ramp surface 76 extends between second profile surface 72 and third profile surface 74. As seen in FIG. 13, third profile surface 74 is approximately co-planar with first profile surface 70.

Figure 11:
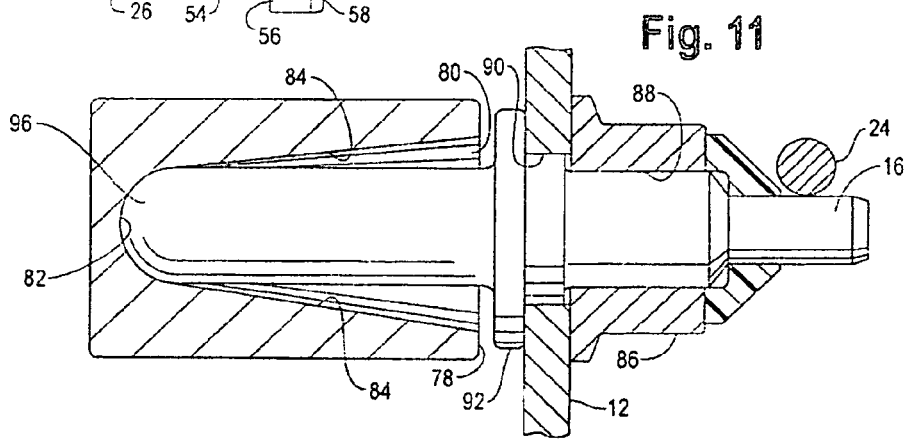
FIG. 11 is a cross section detail view of the swing arm of FIG. 7 mounted on the pivot bolt, taken along line 11-11 of FIG. 6.

Referring to FIGS. 7 and 8, side portion 78 of swing arm 14 includes a bore 80 that is approximately centrally located between ends 26 and 30 of swing arm 14. As seen in FIG. 8, bore 80 extends only part way through swing arm 14, and defines a hemispherical chamber 82 embedded in the swing arm 14 at the inner end of the bore. The lateral edges 84 of bore 80 flare outward, as seen in FIGS. 8 and 11. Bore 80 is adapted to receive pivot bolt 16 (FIGS. 10, 11) such that swing arm 14 is capable of simultaneous rotational motion and rocking motion relative to mounting bracket 12, as will be explained. Cross-over spring 20 maintains the hemispherical chamber 82 of swing arm 14 in pivotal contact with pivot bolt 16.

FIG. 10 is a detail illustration of pivot bolt 16. As seen in FIGS. 6 and 11, pivot bolt 16 is securely attached to mounting bracket 12 by fastener 86 which engages threaded portion 88 of pivot bolt 16. Pivot bolt 16 extends through aperture 90 in mounting bracket 12, and flange 92 of pivot bolt 16 bears tightly against mounting bracket 12 as is known in the art.

The end of pivot bolt 16 opposite threaded portion 88 comprises a relatively thick shaft 94 having a hemispherical end 96. As seen in FIG. 11, hemispherical end 96 of pivot bolt 16 is adapted to be received in and abut against hemispherical chamber 82 when swing arm 14 is mounted on pivot bolt 16, as shown in FIGS. 2, 6 and 11. The cooperation between swing arm 16, mounting bracket 12, hemispherical chamber 82, the hemispherical end 96 of shaft 94 and flared lateral walls 84 of bore 80 permit swing arm 14 to both pivot around and rock back and forth on pivot bolt 16.

Referring to FIGS. 6-8, a weakening aperture 98 is formed completely through swing arm 14 at neck 100 of swing arm 14. Neck 100 defines the weakest stress line, represented by line 102, of the swing arm, such that if excessive force is applied through manual shift lever 36 (FIG. 1) to swing arm 14, the swing arm 14 would break along stress line 102 before swing arm 14 could be moved from the park position, as will be explained. A threaded bolt 104 (FIG. 6) extending through a wide washer 103 is inserted into weakening aperture 98 for the purpose of maintaining the swing arm 14 in contact with pivot bolt 16 if the vehicle operator applies an incorrect or opposite force to shift lever 36, which incorrect or opposite force would tend to lift swing arm 14 away from and off of pivot bolt 16 against the force of cross-over spring 20. In cases where such incorrect or opposite force is applied to shift lever 36, washer 103 will engage surface 105 of mounting bracket 12, preventing undesirable axial movement of swing arm 14.

Figure 3:
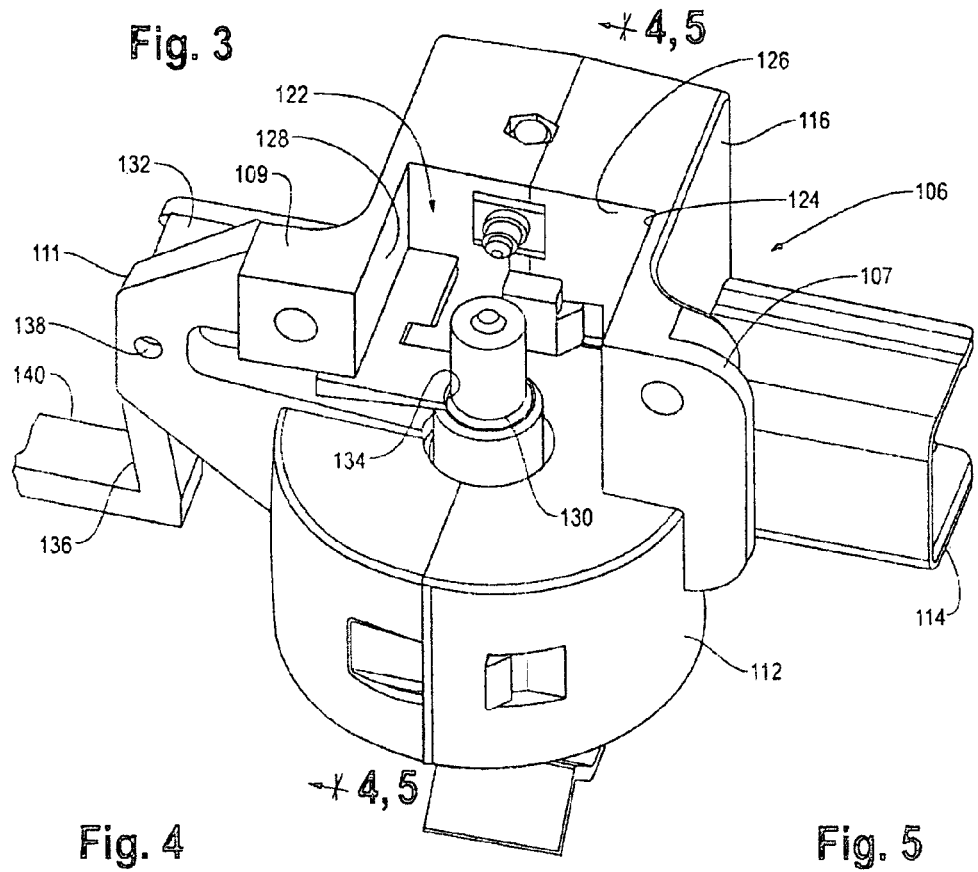
FIG. 3 is a detail perspective view of the solenoid and switch apparatus forming part of the present invention.
Figure 4:
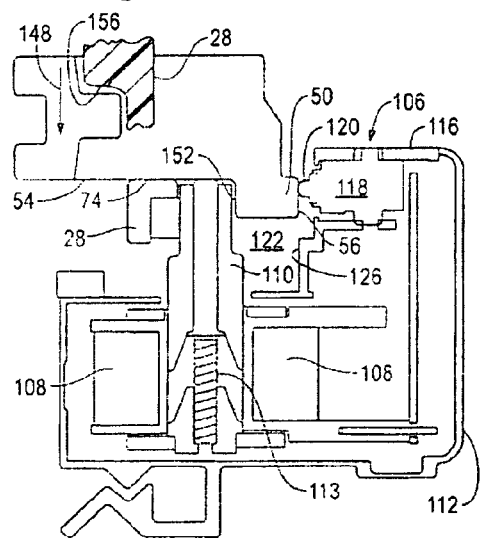
FIG. 4 is a schematic cross sectional view of the solenoid and switch apparatus taken along line 4-4 in FIG. 3, showing the shift arm held in the locked position by the solenoid armature shaft.
Figure 5:
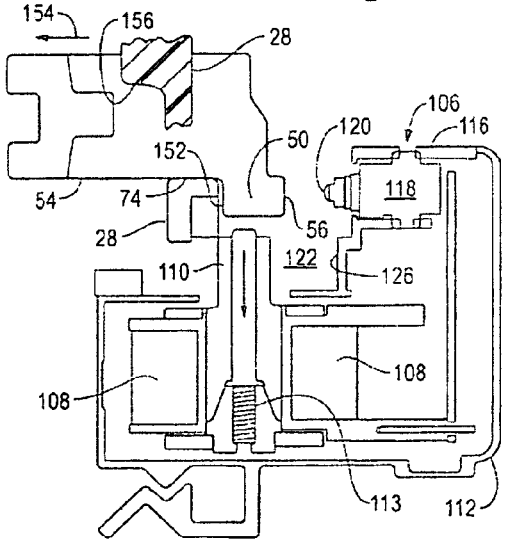
FIG. 5 is a schematic cross sectional view of the solenoid and switch apparatus taken along line 5-5 in FIG. 3, showing the shift arm in the unlocked position.

Referring to FIGS. 1-6 and 12, an electronic park lock/brake shift interlock solenoid assembly 106 is attached directly to mounting bracket 12 adjacent one end of wide opening 62 by means of solenoid mounting brackets 107, 109. As seen in FIGS. 3-5, solenoid assembly 106 includes a current-responsive coil 108 and an armature shaft 110 axially movable through coil 108. Armature shaft 110 and coil 108 are disposed in a solenoid housing 112, and armature shaft 110 extends outward from housing 112 through an aperture in the housing (FIG. 3), whereby armature shaft 110 in an extended position directly contacts swing arm 14. As is common in solenoid operation, armature shaft 110 is biased by spring 113 (FIG. 12) to move the shaft axially out of housing 112 to a lock position in direct contact with the swing arm when the coil 108 is not energized (FIG. 4), and the armature shaft 110 moves axially downward to an unlocked position when the coil 108 is energized, as seen in FIG. 5. As seen in FIG. 3, the top of armature shaft 110 is capped with a sound deadening insert 111, composed of molded urethane or other suitable material as is known in the art.

Referring to FIG. 3, the solenoid housing 112 includes a common connector port 114 through which electrical energy is provided to the solenoid coil 108, and through which electrical signals are conveyed from solenoid assembly 106, as will be explained. Port 114 is adapted to receive a multi-conductor modular plug (not shown) that is connected by electrical wire 115 to brake pedal actuator switch 117, and by electrical wire 119 to the vehicle ignition system (not shown).

Referring to FIGS. 3, 4 and 5, solenoid housing 112 includes a switch housing portion 116 that mounts an integral park detect switch 118 to housing 110. Park detect switch 118 includes an outwardly spring biased actuator plunger 120, shown in FIG. 4 in a depressed or "open" position, and in FIG. 5 in a released or "closed" position. The signal generated by park detect switch 118 is conveyed through electrical wires (not shown) to connector port 114, for purposes to be explained. The actuator plunger 120 of park detect switch 118 extends into a chamber 122 defined by three walls 124, 126 and 128 of switch housing portion 116 (FIG. 3), and by the circumferential surface of solenoid armature shaft 110.

Figure 12:
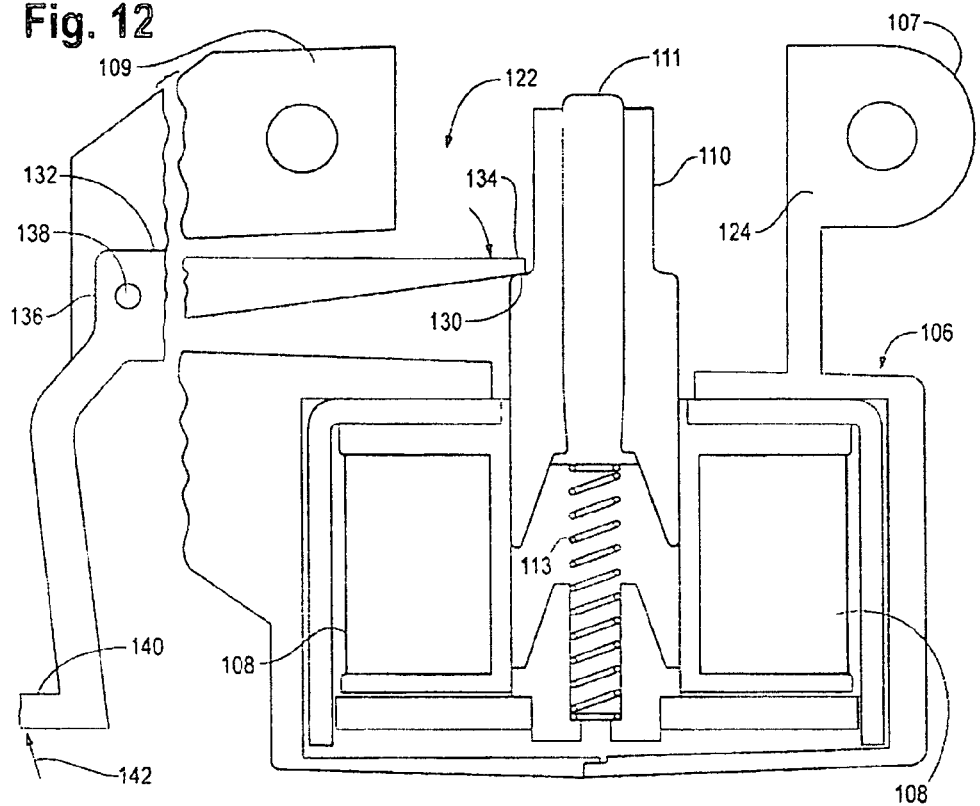
FIG. 12 is a cross-sectional view of the solenoid and switch apparatus of FIG. 3, showing the manual shift override assembly.

Referring to FIG. 12, solenoid armature shall 110 includes a radially by extending ridge 130. A solenoid manual override lever 132 has one end 134 engaging ridge 130, and a middle portion 136 pivotally attached to solenoid housing 112 by pivot pin 138. Outer end 140 of lever 132 is adapted to be manually lifted in the direction shows by arrow 142 (FIG. 12) to apply a downward pressure on armature shaft 110 against the force of spring 113 to manually enable the gear shift lever 36 (FIG. 1) to move the shift module and the vehicle transmission out of the park position, as will be explained, in situations where the vehicle loses electrical power.

When fully assembled for operation, as seen in FIGS. 1 and 2, shift module assembly 10 includes four major components: mounting bracket 12, swing arm 14, solenoid assembly 106 and multi-profile gate plate 28. Bore 80 and hemispherical chamber 82 of swing arm 14 are inserted over the hemispherical end 96 of shaft 94 of pivot bolt 16, and cross-over spring 20 is mounted over spring mounting pin 18. As seen in FIG. 6, end 24 of spring 20 engages pivot bolt 16 and urges pivot bolt 16 axially into contact with mounting bracket 12. The other end 22 of spring 20 engages swing arm 14 and applies a force maintaining swing arm 14 in engagement with pivot bolt 16. Due to the hemispherical points of contact 82, 96 (FIG. 11) between pivot bolt 16 and bore 80 in swing aim 14, and due to the flared lateral edges 84 of the bore 80, swing arm 14 is capable of simultaneous rotation about pivot bolt 16, and rocking motion back and forth toward and away from mounting bracket 12.

As stated previously, solenoid assembly 106 is bolted to mounting bracket 12 by solenoid housing mounting brackets 107, 109 (FIG. 3). Locking and switch actuator assembly 50 of swing arm 14 (FIGS. 7, 8) extends into chamber 122 of solenoid housing 112 (FIGS. 4, 5), for purposes to be explained. Also, as explained previously, multi-profile gate plate 28 is attached to mounting bracket 12 by fasteners 66, 68 (FIG. 2). The opposite end of gate 28 is held firmly in contact with mounting bracket 12 by means of a hooked flange 144 on gate 28 (FIG. 6), which flange 144 extends through wide opening 62 and engages an edge 146 of mounting bracket 12.

To operate the transmission shift module 10, assembled as described above, the vehicle operator manually manipulates shift lever 36 to select the desired transmission gear condition. When it is desired to place the vehicle transmission in a drive condition, or one of several forward drive conditions, shift lever 36 is placed in a selected position shown by indicators visible in the cab of the vehicle, as is known in the art. As lever 36 is moved between one or more of the drive conditions, or into a neutral position, swing arm 14 rotates about pivot bolt 16, and surface 49 of gate contact flange 48 (FIGS. 7, 8) engages first profile surface 70 (FIG. 2) of gate plate 28, enabling swing arm 14 to rotate about pivot bolt 16 in a flat plane. Since second profile surface 72 of gate 28 is at a different plane then first profile surface 70, shift arm 14 cannot be placed in contact with surface 72 unless shift lever 36 is manipulated to rock swing arm 14 about pivot bolt 16 and lift flat underside surface 49 onto second profile surface 72 as swing arm 14 is rotated a slight increment further. In this position, the gear selector lever 36 is in reverse, and the vehicle transmission is in the reverse condition.

To place the vehicle and the transmission in the park condition, and prevent movement of the wheels of the vehicle, the shift lever 36 is manipulated to rotate swing arm 14 slightly further, and the swing arm is simultaneously manipulated in a rocking motion such that surface 49 of gate contact flange 48 slides onto ramp surface 76 and then onto flat surface 77 of gate plate 28. Further rotation of swing arm 14 about pivot bolt 16 places shift module 10 in the park position, wherein gate contact flange 48 has dropped off of flat surface 77 and has moved in the direction indicated by arrow 148 in FIG. 4, and underside surface 49 of gate contact flange 48 is in engagement with third profile surface 74, which is substantially co-planer with first profile surface 70.

When in the park position as described, support bracket 52 of swing arm 14 extends through wide opening 62, as underside surface 49 of flange 48 engages flat surface 74 of gate plate 28, and locking and switch actuator assembly 50 simultaneously extends through wide opening 62 of connecting bracket 12 and into chamber 122 of solenoid housing 112 (FIGS. 4,5). As seen in FIG. 4, as actuator assembly 50 enters chamber 122, armature shaft 110 of solenoid assembly 106 is in its outward position under the force of coil spring 113. As actuator assembly 50 enters chamber 122 in the direction of arrow 148, a wall 152 of switch actuator 56 is positioned adjacent to the outer end of armature 110. Simultaneously, second surface 60 (FIG. 7) of switch actuator 56 contacts and depresses actuator plunger 120 of park detect switch 118. In the depressed position, park detect switch 118 is in its open condition, allowing the vehicle key to be removed from the ignition key slot.

To remove swing arm 14 from the park position shown in FIG. 4, it is necessary to rock swing arm 14 on pivot bolt 16, such that gate contact flange 48 of swing arm 14 is lifted oil of gate profile surface 74. When this rocking motion occurs, locking and switch actuator assembly 50 must move in the direction indicated by the arrow 154 in FIG. 4. However, armature 110, in its outward position, abuts wall 152, preventing actuator assembly 50 from lateral movement in the direction of arrow 154. In this position, as seen in FIG. 4, the actuator assembly 50 and the swing arm 14 are both locked in the park position, preventing the vehicle operator from manipulating selector lever 36 out of the park condition. When installed in the vehicle, the shift module 10 is configured to prevent movement out of the park condition while the ignition system is off, or when the brake pedal is not depressed with the ignition system on.

When the operator desires to move the vehicle, the ignition system is turned on, and the operator must depress the vehicle brake pedal to enable shift module 10 to advance out of the park condition. Electrical signals from the ignition system and the brake pedal actuation switch 117 are transmitted to solenoid assembly 106 through a modular plug connection extending into common connector port 114 (FIG. 3). With the ignition turned on and the brake pedal depressed, coils 108 are energized, and solenoid actuator shaft 110 is moved downward, as viewed in FIG. 5, against the force of spring 113 and away from contact with wall 152 of park detect switch actuator 56. With armature 110 in the position shown in FIG. 5, actuator assembly 50 is able to move laterally in chamber 122 in the direction of arrow 154 (FIG. 4), which enables gate contact flange 48 to be lifted off of third surface 74 of multi-profile gate 28 to a position whereby contact flange 48 clears flat surface 77 of gate plate 28, and the swing arm 14 can be pivoted about pivot bolt 16 to one of the other operating positions of the transmission shift module 10, or to the neutral position. As seen in FIG. 5, lateral movement of actuator assembly 50 in the direction of arrow 154 (FIG. 4) also releases plunger 120 of park detect switch 118, whereby switch 118 is moved to its closed position, sending a signal to the ignition system preventing removal of the ignition key while the vehicle transmission is in any operating condition other than park.

If the vehicle loses all electrical power, armature 110 will be in its default, or extended position shown in FIG. 4, responsive to the force of coil spring 113. With no electrical power, the swing arm 14 will not be permitted to be removed from the park position. To solve this potential problem and referring to FIG. 12, the operator applies manual pressure in the direction of arrow 142 to outer end 140 of override lever 132. Lever 132 will pivot about pin 138, and end 134, which is lodged on ridge 130 of armature 110, will drive armature 110 downward, releasing armature 110 from contact with wall 152 (FIGS. 4,5), thus enabling the swing arm 14 to be manually moved out of the park position, as described above.

The shift module 10 provides another safety feature that prevents manipulation of the shift module out of the park position when the ignition is off or the ignition is on but the brake pedal is not depressed. As seen in FIG. 4, the swing arm 14 is physically immobilized under these conditions due to the position of armature 110 engaging wall 152 of actuator assembly 50. As described previously, and referring to FIGS. 7 and 8, weakening aperture 98 extends through swing arm 14 at neck 100 of the swing arm. The neck 100 of the swing arm can withstand only a limited amount of bending force until the swing arm 14 breaks along stress line 102 (FIG. 8). Swing arm 14 is designed and configured such that the swing arm will fail along line 102 prior to locking and switch actuator assembly 50 being removed from chamber 122 upon the application of excessive force to the swing aim, thus making it impossible for one attempting to steal the vehicle to move the transmission out of the park position.

The foregoing description of an illustrated embodiment of the invention has been presented for purposes of illustration and description, and is not intended to be exhaustive or to limit the invention to the precise form disclosed. The description was selected to best explain the principles of the invention and practical application of these principles to enable others skilled in the art to best utilize the invention in various embodiments and various modifications as are suited to the particular use contemplated. It is intended that the scope of the invention not be limited by the specification, but be defined by the claims set forth below.

We claim:

1. A shift module assembly for controlling the movement of a vehicle transmission out of a park condition responsive to a condition of the ignition system of the vehicle and responsive to a position of the vehicle brake pedal, comprising:
   a moveable swing arm adapted to selectively control the condition of the vehicle transmission;
   said swing arm adapted to be in a park position when said vehicle transmission is in said park condition;
   said swing arm being locked in an immobile position by a solenoid operated armature shaft when said swing arm is placed in said park position, said armature shaft in direct contact with said swing arm when said swing arm is in said locked position;
   said armature shaft adapted to release said swing arm from said locked position upon actuation of said vehicle ignition system and depression of said vehicle brake pedal;
   a mounting bracket adapted to mount the shift module to a stationary portion of the vehicle;
   the swing arm pivotally mounted for movement relative to said mounting bracket, said swing arm capable of rotational movement and rocking movement relative to said mounting bracket;
   a multi-profile gate plate removably attached to said mounting bracket; said multi-profile gate plate having a plurality of profile surfaces;
   said swing arm having a gate contact flange contacting one of said profile surfaces depending upon the rotational position of the swing arm relative to the mounting bracket.

2. The shift module assembly of claim 1, wherein:
   said gate contact flange is biased against said one profile surface when said swing arm is in a position adapted to maintain said vehicle transmission in said park position;
   said gate contact flange being moved in a direction normal to the plane of the mounting bracket away from said one profile surface against said biasing force, permitting rotation of said swing arm in a plane parallel to said mounting bracket, said rotation of said swing arm adapted to move said vehicle transmission out of said park position.

3. The shift module assembly of claim 2, wherein:
   said one profile surface is defined by a wall at one end, said wall extending outward from said one profile surface, said gate contact flange held against rotational movement by said wall when said gate contact flange is in engagement with said one profile surface.

4. The shift module of claim 3, wherein:
   said gate contact flange moves in said rocking motion out of contact with said one profile surface and said wall to enable rotation of said swing arm.

5. The shift module assembly of claim 1, wherein:
   said swing arm includes a locking and switch actuator assembly;
      a solenoid assembly attached to said mounting bracket, said solenoid assembly including a chamber, said locking and switch actuator assembly extending into said chamber when said gate contact flange of said swing arm contacts said one profile surface of said gate plate.

6. The shift module assembly of claim 5, wherein:
   said mounting bracket includes an opening adjacent said gate plate; and
   said locking and switch actuator assembly extends through and is movable in said opening.

7. The shift module assembly of claim 5, wherein:
   said locking and switch actuator assembly engages said solenoid operated armature shaft when said armature shaft is in a first position extended from said solenoid assembly; and
      said locking and switch actuator assembly is free of engagement with said armature shaft when said armature shaft is in a second position retracted into said solenoid assembly.

8. The shift module assembly of claim 5, wherein:
   said solenoid assembly includes a park condition detect switch adapted to indicate that the swing arm is in the park position in a first detect switch position, and that the swing arm is out of the park position in a second detect switch position;
   said park detect switch adapted to be electrically connected to said vehicle ignition system and adapted to allow removal of an ignition key when said park condition detect switch is in said first position.

9. The shift module assembly of claim 8, wherein:
   said park condition detect switch is adapted to prohibit removal of said ignition key when said park condition detect switch is in said second position.

10. The shift module assembly of claim 1, wherein:
    said swing arm includes an extended surface adapted to selectively contact one of said plurality of profile surfaces;

said swing arm including a locking and switch actuator assembly contacting said armature shaft when said swing arm is in said immobile position.

11. A shift module assembly for controlling the movement of a vehicle transmission out of a park condition responsive to a condition of the ignition system of the vehicle and responsive to a position of the vehicle brake pedal, comprising:
 a moveable swing arm adapted to selectively control the condition of the vehicle transmission;
 said swing arm adapted to be in a park position when said vehicle transmission is in said park condition;
 said swing arm being locked in an immobile position by a solenoid operated armature shaft when said swing arm is placed in said park position, said armature shaft in direct contact with said swing arm when said swing arm is in said locked position;
 said armature shaft adapted to release said swing arm from said locked position upon actuation of said vehicle ignition system and depression of said vehicle brake pedal;
 a mounting bracket adapted to mount the shift module to a stationary portion of the vehicle;
the swing arm pivotally mounted for movement relative to said mounting bracket, said swing arm capable of rotational movement and rocking movement relative to said mounting bracket;
a multi-profile gate plate is removably attached to said mounting bracket; said multi-profile gate plate having a plurality of profile surfaces;
 said swing arm having a gate contact flange contacting one of said profile surfaces depending upon the rotational position of the swing arm relative to the mounting bracket;
 said mounting bracket includes a pivot bolt extending outward from the plane of said mounting bracket, said pivot bolt having a first hemispherical end and a second end, said second end attaching said pivot bolt to said mounting bracket;
 said swing arm having a bore partially extending though said swing arm, said bore defining a hemispherical chamber internally said of swing arm;
 said hemispherical chamber of said swing arm adapted to receive said first hemispherical end of said pivot bolt.

12. The shift module assembly of claim 11, wherein:
a cross-over spring extends between said mounting bracket and said swing arm, said cross-over spring applying a bias force to maintain contact between said hemispherical chamber of said swing arm and said first hemispherical end of said pivot bolt as said swing arm advances though rotational movement and rocking movement relative to said pivot bolt.

13. The shift module assembly of claim 11, wherein:
said bore in said swing arm includes side walls flaring laterally and outwardly from said hemispherical chamber.

14. A shift module assembly for controlling the movement of a vehicle transmission out of a park condition responsive to a condition of the ignition system of the vehicle and responsive to a position of the vehicle brake pedal, comprising:
 a moveable swing arm adapted to selectively control the condition of the vehicle transmission;
 said swing arm adapted to be in a park position when said vehicle transmission is in said park condition;
 said swing arm being locked in an immobile position by a solenoid operated armature shaft when said swing arm is placed in said park position, said armature shaft in direct contact with said swing arm when said swing arm is in said locked position;
 said armature shaft adapted to release said swing arm from said locked position upon actuation of said vehicle ignition system and depression of said vehicle brake pedal; and
 a portion of said swing arm contacting a park detect switch when said swing arm is in said locked position.

15. The shift arm module assembly of claim 14, wherein:
said portion of said swing arm comprises a locking and switch actuation assembly.

16. A shift module assembly for controlling the movement of a vehicle transmission out of a park condition responsive to a condition of the ignition system of the vehicle and responsive to a position of the vehicle brake pedal, comprising:
 a moveable swing arm adapted to selectively control the condition of the vehicle transmission;
 said swing arm adapted to be in a park position when said vehicle transmission is in said park condition;
 said swing arm being locked in an immobile position by a solenoid operated armature shaft when said swing arm is placed in said park position, said armature shaft in direct contact with said swing arm when said swing arm is in said locked position;
 said armature shaft adapted to release said swing arm from said locked position upon actuation of said vehicle ignition system and depression of said vehicle brake pedal;
 a mounting bracket adapted to mount the shift module to a stationary portion of the vehicle;
 the swing arm pivotally mounted for movement relative to said mounting bracket, said swing arm capable of rotational movement and rocking movement relative to said mounting bracket;
 a solenoid assembly is attached to said mounting bracket,
 a manually operated override lever movably attached to one of said mounting bracket and said solenoid assembly, said override lever engaging said armature shaft;
 said override lever moving said armature shaft out of said immobile position upon movement of said override lever.

17. The shift module assembly of claim 16 wherein:
said armature shaft includes a circumferential ridge;
said override lever engaging said ridge.

18. A shift module assembly for controlling the movement of a vehicle transmission out of a park condition responsive to a condition of the ignition system of the vehicle and responsive to a position of the vehicle brake pedal, comprising:
 a moveable swing arm adapted to selectively control the condition of the vehicle transmission;
 said swing arm adapted to be in a park position when said vehicle transmission is in said park condition;
 said swing arm being locked in an immobile position by a solenoid operated armature shaft when said swing arm is placed in said park position, said armature shaft in direct contact with said swing arm when said swing arm is in said locked position;
 said armature shaft adapted to release said swing arm from said locked position upon actuation of said vehicle ignition system and depression of said vehicle brake pedal;
 a mounting bracket adapted to mount the shift module to a stationary portion of the vehicle;
 the swing arm pivotally mounted for movement relative to said mounting bracket, said swing arm capable of rotational movement and rocking movement relative to said mounting bracket;
 a manually operated shift lever operatively connected to said swing arm;

said swing arm having a neck portion, a weakening aperture extending through said swing arm at said neck portion, said weakening aperture establishing a potential stress line in said swing arm, said swing arm adapted to break along said stress line when excessive force is applied to said manually operated shift lever.

19. The shift module assembly of claim 18, further including:
a fastener extending through said weakening aperture of said swing arm;
said fastener supporting a radially extending stop surface, said stop surface extending over a corresponding surface of said mounting bracket, said swing arm prevented from becoming disengaged from the pivotal mounting between said swing arm and said mounting bracket.

20. A shift module assembly for controlling the movement of a vehicle transmission out of a park condition responsive to a condition of the ignition system of the vehicle and responsive to a position of the vehicle brake pedal, comprising:
a moveable swing arm adapted to selectively control the condition of the vehicle transmission;
said swing arm adapted to be in a park position when said vehicle transmission is in said park condition;
said swing arm being locked in an immobile position by a solenoid operated armature shaft when said swing arm is placed in said park position;
said armature shaft adapted to release said swing arm from said locked position upon actuation of said vehicle ignition system and depression of said vehicle brake pedal;
said swing arm including a neck portion;
a stress line extending across said neck portion;
said swing arm adapted to break along said stress line when excessive force is applied to said swing arm.

21. The shift module assembly of claim 20, wherein:
said swing arm includes a weakening aperture in said swing arm; said weakening aperture located at said neck portion and said weakening aperture creating said stress line.

22. A shift module assembly for controlling the movement of a vehicle transmission out of a park condition responsive to a condition of the ignition system of the vehicle and responsive to a position of the vehicle brake pedal, comprising:
a moveable swing arm adapted to selectively control the condition of the vehicle transmission;
said swing arm adapted to be in a park position when said vehicle transmission is in said park condition;
said swing arm being locked in an immobile position by a solenoid operated armature shaft when said swing arm is placed in said park position said armature shaft in direct contact with said swing arm when said swing arm is in said locked position;
said armature shaft adapted to release said swing arm from said locked position upon actuation of said vehicle ignition system and depression of said vehicle brake pedal;
a mounting bracket adapted to mount the shift module to a stationary portion of the vehicle;
the swing arm pivotally mounted for movement relative to said mounting bracket, said swing arm capable of rotational movement and rocking movement relative to said mounting bracket;
a solenoid assembly attached directly to said mounting bracket; and
said solenoid assembly including a housing encompassing said solenoid; said solenoid operated armature shaft directly contacting said swing arm.

* * * * *